United States Patent [19]

Castellano

[11] Patent Number: 4,990,474

[45] Date of Patent: Feb. 5, 1991

[54] PROCESS FOR PREPARING A ZIRCONIUM DIOXIDE PRECURSOR

[75] Inventor: Maurizio Castellano, Turin, Italy

[73] Assignee: Eniricerche S.p.A., Milan, Italy

[21] Appl. No.: 431,649

[22] Filed: Nov. 3, 1989

[30] Foreign Application Priority Data

Nov. 11, 1988 [IT] Italy .................... 22590 A/88

[51] Int. Cl.$^5$ .................................... C04B 35/48
[52] U.S. Cl. .............................. 501/103; 423/612
[58] Field of Search ................ 252/312, 313.1; 423/492, 608, 611, 612; 501/12, 103

[56] References Cited

FOREIGN PATENT DOCUMENTS 1227917 10/1986 Japan ............................ 425/608

Primary Examiner—Mark L. Bell
Assistant Examiner—Chris Gallo

Attorney, Agent, or Firm—Hedman, Gibson, Costigan & Hoare

[57] ABSTRACT

A precursor of zirconium dioxide in form of submicronic particles is obtained by:

dispersing zirconium tetrachloride in an inert, liquid organic vehicle, with a surfactant being used in order to obtain a stable dispersion, adding water to said stable dispersion in order to form an emulsion, or adding water and a co-emulsifier in order to obtain a microemulsion, so as to hydrolyse zirconium tetrachloride and cause the zirconium dioxide precursor to precipitate from the system obtained, and recovering said precipitated precursor.

Such a precursor can be submitted to treatments of calcination in order to prepare zirconium dioxide for ceramic uses.

10 Claims, No Drawings

PROCESS FOR PREPARING A ZIRCONIUM DIOXIDE PRECURSOR

The present invention relates to a process for preparing a precursor of zirconium dioxide in form of submicronic particle, suitable for being converted into zirconium dioxide for ceramic uses.

Zirconium dioxide is a material widely used in the art. For example, its catalytic characteristics in the processes of pyrolysis of hydrocarbons and in several organic reactions are known. Thanks to its high melting temperature (of about 2,700° C.), zirconium dioxide has been used for long time in the manufacture of ceramic and refractory materials. In particular, glass industry made a large use of it, due to its good mechanical characteristics and its inertness towards concentrated acids and alkalies. With these characteristics, those combine, which relate to the high refractive index, to the low coefficient of thermal expansion and to the high electrical resistance of this product.

Zirconium dioxide has recently found an use in the manufacture of ceramic components for electronic uses, both in the sector of semiconductors, and in the sector of superconductors, for example in alloy with aluminum and yttrium oxides. In these uses, zirconium dioxide is required in the form of submicronic particles, which should be as uniform and regular as possible, for the purpose of obtaining a ceramic material homogeneous in all of its points, endowed with high mechanical characteristics, and capable of generating highly reliable end products for use in electronics.

Various processes have been proposed in the art in order to obtain zirconium dioxide in submicronic form. Such processes are mainly based on the controlled hydrolysis of zirconium alkoxides.

In particular, the hydrolysis of zirconium alkoxides and the precipitation in alcoholic media is described by B. Fegley et al. in Bull. Am. Cer. Soc., 63, 374 (1983) and by H. K. Bowen et al., in Advances in Ceramics, Am. Cer. Soc. Press, Columbus (OH), 1984, Vol. 9, page 140.

The hydrolysis and precipitation from emulsion systems is described by A. Bagley MIT Report No. 54. January 1985.

Processes for producing zirconium are furthermore known in the art, which are based on the hydrolysis of zirconium chlorides. In particular, according to such processes, a zirconium chloride, such as zirconium tetrachloride, is dissolved in water, is hydrolyzed by means of the addition of a base, such as ammonium hydroxide, and is then precipitated as an hydroxide.

This processes known from the prior art are basically affected by the disadvantage that the hydrolysis kinetics is difficult to be controlled, and therefore that particles having desired size and shape are difficult to be obtained on a reproducible basis.

The purpose of the present invention is of overcoming the above mentioned drawbacks which affect the prior art.

The following experimental examples are given in order to better explain the invention.

In particular the present Applicant found now, according to the present invention, that a controlled hydrolysis of zirconium tetrachloride can be carried out, and submicronic particles of a zirconium dioxide precursor can be formed, by putting water into contact with a dispersion of solid particles of zirconium tetrachloride in a non-aqueous vehicle.

In accordance therewith, the present invention relates to a process for preparing a precursor of zirconium dioxide by means of the hydrolysis with water of zirconium tetrachloride, characterized in that:

zirconium tetrachloride is dispersed in an inert, liquid organic vehicle, with a surfactant being used in order to obtain a stable dispersion, to said stable dispersion water is added in order to form an emulsion, or water and a co-emulsifier are added in order to form a microemulsion, so as to hydrolyse zirconium tetrachloride and cause the zirconium dioxide precursor to precipitate from the so obtained system, and said precipitated precursor is recovered.

For preparing the dispersion an inert, liquid organic vehicle is used in which zirconium tetrachloride is insoluble. For this purpose, the aliphatic and aromatic hydrocarbons are suitable, which are liquid under room temperature conditions, such as nonane, decane, undecane, toluene, xylene and relevant mixtures. The liquid vehicle of the dispersion should be suitably anhydrous in order to prevent any premature hydrolysis of zirconium tetrachloride.

According to the present invention, zirconium tetrachloride is dispersed in the liquid organic vehicle by means of any suitable physical systems, e.g., by sonication. The so obtained dispersion will have a low content of solids, and will typically have a solid content lower than 1% by weight.

The dispersion is made stable by means of a surfactant added during the dispersion treatment, or after the same treatment. In particular a few units % of an oil-soluble, non-ionic or anionic surfactant or of a mixture of such surfactants is used.

To the so obtained stable dispersion water is then added with stirring in order to form the emulsion and cause zirconium tetrachloride to be hydrolysed and the precursor of zirconium dioxide to precipitate out from the same emulsion. In particular, the amount of added water should be larger than the amount stoichiometrically required for the hydrolysis of zirconium tetrachloride, and will in general be from about 30 up to about 100 times as large as the stoichiometric value.

Typically, the emulsion from which the precursor of zirconium dioxide is precipitated off contains 90-95% by weight of inert, liquid organic vehicle, 3-4% by weight of surfactant agent, 1.5-4% by weight of water and 0.1-0.8% of zirconium tetrachloride.

The reaction of hydrolysis of zirconium tetrachloride and the precipitation of the precursor of zirconium dioxide are caused to take place at room temperature value (20°-25° C.) or at temperatures close to room temperature values. The required times are of the order of from 1 to 2 hours.

The precipitated precursor is separated from the emulsion by means of the usual techniques of separation of a solid from a liquid phase, and is submitted to washing, in particular with liquid aliphatic alcohols. The so obtained precursor is in the form of submicronic cubic or pseudo-spherical particles a function of the conditions of preparation, in particular of the pH value at which the process is carried out.

As an alternative, zirconium tetrachloride is dispersed in the inert, liquid organic medium (in particular toluene), preferably containing a portion of the surfactant and of the co-surfactant (in particular n-butanol) in the useful proportions for forming a microemulsion. The dispersion is then added to a microemulsion containing toluene, butanol, aqueous hydrochloric acid and the surfactant, and after mixing, its total composition is, typically, of about: 53% by weight of toluene, 25% by weight of n-butanol, 21.3% by weight of surfactant, 0.7% by weight of 2 N aqueous hydrochloric acid, and 0.04% by weight of zirconium tetrachloride.

The reaction of hydrolysis and the precipitation of the precursor of zirconium dioxide are still caused to take place at room temperature. The times required for the hydrolysis are of 1-2 hours. The precursor is separated from the microemulsion by means of the usual techniques, and particles are obtained, which are repeatedly washed with aliphatic alcohols. These particles have a pseudo-spherical habit and a size smaller than 1 micron and typically smaller than about 200 nm.

The precursor obtained from the emulsion or microemulsion can be submitted to the usual treatments of calcination, at a high temperature, in order to eliminate the hydration water and any possible organic residues, and to obtain a ceramic powder suitable for being treated in the sintering processes.

The following experimental examples are reported in order to better illustrate the invention.

EXAMPLES 1-4

The process is carried out in these Examples by adding zirconium tetrachloride to toluene contained in a cylindrical container and dispersing zirconium tetrachloride throughout the diluent by sonication.

For that purpose, a conventional ultrasound bath is used, until a complete dispersion of the particles of zirconium tetrachloride in the liquid vehicle is obtained. Toluene used as the liquid vehicle is previously thoroughly dehydrated on zeolites and is filtered through a 0.5 μm Teflon membrane. To the so obtained dispersion, kept stirred, the surfactant sodium bis-(2-ethylhexyl)-sulfosuccinate (AOT), and then water, is added. Water is previously bi-distilled and filtered through an 0.2 μm millipore membrane. The addition of water is carried out by means of a Hamilton syringe. The reaction of hydrolysis is allowed to proceed for 1.5 hours at room temperature (20°-25° C.), and the pH value of the system, at the end of the hydrolysis, is of about 2. The precipitate of zirconium dioxide precursor is centrifuged off, is washed twice in butanol, then in ethanol, and is finally suspended in water. In the following table the compositions of the emulsions used in Examples 1-4 are reported.

TABLE

| Example No. | | 1 | 2 | 3 | 4 |
|---|---|---|---|---|---|
| Toluene | (g) | 26.10 | 26.10 | 78.30 | 78.30 |
| | (% by weight) | 92.23 | 92.71 | 92.73 | 94.42 |
| $ZrCl_4$ | (g) | 0.20 | 0.050 | 0.130 | 0.130 |
| | (% by weight) | 0.71 | 0.18 | 0.15 | 0.16 |
| AOT | (g) | 1.00 | 1.00 | 3.00 | 3.00 |
| | (% by weight) | 3.53 | 3.55 | 3.55 | 3.62 |
| Water | (g) | 1.00 | 1.00 | 3.00 | 1.50 |
| | (% by weight) | 3.53 | 3.55 | 3.55 | 1.81 |

The precursor of zirconium dioxide of Examples 1-4 is submitted to observation under the optical and electronic microscope, which shows cubic or pseudospherical particles of size smaller than 1 μm. In particular, the particles show a smaller size when the process is carried out with a higher-dilution system.

EXAMPLE 5

A mixture containing 0.08 g of zirconium tetrachloride, 53 g of toluene, 25 g of n-butanol and 22 g of AOT is prepared and the system is dispersed by means of a mechanical action. A microemulsion is furthermore prepared with the same proportions of toluene, n-butanol and AOT, and containing 1.4% by weight of 2N HCl. The dispersed system is diluted with the microemulsion, in the mutual weight ratio of 1:1. The end system has the following composition: 52.66% by weight of toluene, 25.43% by weight of n-butanol, 21.17% by weight of AOT, 0.7% by weight of 2N aqueous hydrochloric acid, and 0.04% by weight of zirconium tetrachloride.

The reaction of hydrolysis is allowed to proceed for 1.5 hours at room temperature (20°-25° C.), and the precipitate of zirconium dioxide precursor is centrifuged off, is washed twice in butanol, then in ethanol, and is finally suspended in water. The precipitate, when observed under the optical and electronic microscope, appears to be constituted by homogeneous, pseudospherical particles of size smaller than 200 nm.

I claim:

1. Process for preparing a precursor of zirconium dioxide by means of the hydrolysis with water of zirconium tetrachloride, characterized in that:
   zirconium tetrachloride is dispersed in an inert, liquid organic vehicle, with a surfactant being used in order to obtain a stable dispersion,
   to said stable dispersion water is added in an amount from about 30 to about 100 times as large as the stoichiometric amount needed to hydrolyze zirconium tetrachloride in order to form an emulsion, with or without a co-surfactant in order to form a microemulsion, and hydrolyze zirconium tetrachloride to cause the zirconium dioxide precursor to precipitate; and
   thereafter recovering said precipitated precursor.

2. Process according to claim 1, characterized in that the dispersion of zirconium tetrachloride is carried out by sonication.

3. Process according to claim 1, characterized in that the inert organic liquid is an aliphatic or aromatic liquid hydrocarbon, and is selected from the group consisting of nonane, decane, undecane, toluene, xylene and mixtures thereof.

4. Process according to claim 1, characterized in that said surfactant is ann oil-soluble anionic or nonionic surfactant.

5. Process according to claim 1, characterized in that the inert liquid organic vehicle further comprises a co-surfactant.

6. Process according to claim 1, characterized in that the hydrolysis water is in an amount from 5 to 20 times as large as the amount stoichiometrically required in order to hydrolyse zirconium tetrachloride.

7. Process according to claim 1, characterized in that the hydrolysis of zirconium tetrachloride is carried out at room temperature for a time of 1-2 hours.

8. Process according to claim 1, characterized in that said emulsion contains 90-95% by weight of inert, liquid organic vehicle, 3-4% by weight of surfactant, 1.5-4% by weight of water and 0.1-0.8% by weight of zirconium tetrachloride.

9. Process according to claim 1, characterized in that said microemulsion contains about 53% by weight of inert, liquid organic vehicle, 21.5% by weight of surfactant, 25% by weight of co-surfactant, 0.7% by weight of 2N aqueous hydrochloric acid, and 0.04% by weight of zirconium tetrachloride.

10. A process according to claim 5, characterized in that the co-surfactant is N-butanol.

* * * * *